United States Patent [19]

Speaight et al.

[11] Patent Number: 5,632,495
[45] Date of Patent: May 27, 1997

[54] ELASTOMER SEALING RING OF RELATIVELY LARGE DIAMETER

[75] Inventors: Theodor Speaight, Ernsdorf; Emile Lonardi, Bascharage; Giovanni Cimenti, Fentange, all of Luxembourg

[73] Assignee: Paul Wurth S.A., Luxembourg

[21] Appl. No.: 639,095

[22] Filed: Apr. 24, 1996

Related U.S. Application Data

[63] Continuation of Ser. No. 227,537, Apr. 14, 1994, abandoned.

[30] Foreign Application Priority Data

Apr. 14, 1993 [LU] Luxembourg .............................. 88247

[51] Int. Cl.⁶ ...................................................... F16J 15/10
[52] U.S. Cl. ............................ 277/177; 277/189; 277/215
[58] Field of Search ..................................... 277/102, 165, 277/168, 172, 173, 177, 189, 207 R, 207 A, 215

[56] References Cited

U.S. PATENT DOCUMENTS

| Re. 28,105 | 8/1974 | Traub | 277/165 |
|---|---|---|---|
| 2,099,722 | 11/1937 | Byers . | |
| 2,590,245 | 3/1952 | Harbison . | |
| 3,149,849 | 9/1964 | Baldridge | 277/165 |
| 3,396,712 | 8/1968 | Sukraida et al. . | |
| 3,920,254 | 11/1975 | Johnston et al. | 277/177 |
| 4,342,336 | 8/1982 | Satterthwaite et al. . | |
| 4,415,166 | 11/1983 | Beia . | |
| 4,448,429 | 5/1984 | Thomas | 277/165 |
| 5,088,744 | 2/1992 | Oseman | 277/177 |

FOREIGN PATENT DOCUMENTS

| 1464445 | 12/1966 | France . | |
|---|---|---|---|
| 2551360 | 5/1977 | Germany . | |
| 0039704 | 7/1936 | Netherlands | 277/215 |

Primary Examiner—William A. Cuchlinski, Jr.
Assistant Examiner—John L. Beres
Attorney, Agent, or Firm—Fishman, Dionne & Cantor

[57] ABSTRACT

A sealing ring of relatively large diameter made from an elastomer material, particularly for fitting into a gastight valve is presented for the purpose of preventing and/or alleviating stresses that cause tearings in and on the surface of the sealing ring. This is accomplished by modifying the cross-section of the sealing ring relative to the cross-section of a receiving channel such that the cross-section of the sealing ring forms a central foot which lies in bearing contact with a base surface of the receiving channel and is radially limited by two concave indentations. The two concave indentations are dimensioned so they form, with the corresponding boundary surfaces of the channel, a respective cavity, into which a substantial part of the elastomer material can yield whenever a surface load is applied to the exposed sealing surface without substantially altering the concave configuration of the indentations.

9 Claims, 3 Drawing Sheets

ELASTOMER SEALING RING OF RELATIVELY LARGE DIAMETER

RELATION TO OTHER APPLICATIONS

This application is a continuation of U.S. application Ser. No. 08/227,537, filed Apr. 14, 1994 now abandoned.

BACKGROUND OF THE INVENTION

This invention relates generally to elastomer sealing rings of relatively large diameter. More particularly, this invention relates to an elastomer sealing ring which fits into an annular channel of relatively large diameter which is open to one side with a base surface and two mutually opposing side surfaces. The sealing ring has approximately the same cross-section as the channel and exhibits an exposed sealing surface, which, when the sealing ring is fitted in its channel, faces the open side of the channel and can be subjected by a sealing bead to a surface load approximately parallel to the axis of the seating.

Sealing rings of the type described above are used, for example, in larger, gastight valves. Such valves have a diameter of 0.5 to 2 meters or more. These valves are used, for example, on blast furnaces, and are exposed to substantial contact pressures. Applicant has discovered that these elastomer sealing rings of relatively large diameter can experience relatively large tears in the surface after just a relatively few load cycles. These tears, which are a priori inexplicable, are localized on the one hand in the ring surfaces facing the channel. More particularly, these tears are localized in the zones between the base surface and side surfaces and on the other hand in the exposed sealing surface.

It will be appreciated that there is a need to improve the geometry of the sealing ring in order to prevent these tears or greatly reduce these inexplicable tears discussed above.

Complex calculations of the sealing ring according to the "finite elements" method have shown, in fact, that high stresses arise at the aforementioned zones and produce tearing, primarily whenever the sealing ring is constricted in the channel. These high stresses can be observed even for a relatively low surface load applied to the exposed sealing surface.

It is generally known that an elastomer material is not compressible and therefore needs space to expand. However, according to the prior art, this factor was only taken into account insofar as the sealing ring was dimensioned such that it could be fitted with radial play into the channel. The sealing ring was therefore able to expand laterally, i.e., to yield at right-angles to the direction of load into the channel. Applicant has found, however, that this measure is not, however, sufficient to prevent the aforementioned tearing, for at least the following reasons:

a) the lateral expansion of the sealing ring inevitably produces an unfavorable stress distribution, since, for example, significant shearing forces arise between the base surface of the channel and the sealing ring;

b) it has been shown in practice that dimensional errors in sealing rings over 1 meter in diameter are generally greater than the calculated play between the sealing ring and the channel. It therefore very often happens, particularly in sealing rings of relatively large diameter, that the sealing ring fails to assume that position in the channel which allows it stress-relieving expansion; and c) it cannot be ruled out that the radial play between the channel and the sealing ring will be lost by virtue of the seat becoming deformed or by virtue of solids getting into the channel during fitting.

SUMMARY OF THE INVENTION

The above-discussed and other problems and deficiencies of the prior art are overcome or alleviated by the elastomer sealing ring of relatively large diameter of the present invention. In accordance with the present invention, the cross-section of the elastomer sealing ring of relatively large diameter is modified relative to the cross-section of the channel such that the sealing ring forms a central foot. This central foot lies in bearing contact with the base surface of the channel and is radially limited by two concave indentations in the sealing ring. Each of these concave indentations extends radially from the base surface up to one of the two side surfaces of the channel so as to form, with the corresponding boundary surfaces of the channel, a respective cavity in the channel. These concave indentations surrounding the central foot are dimensioned such that, whenever a surface load is applied to the exposed sealing surface, a substantial part of the elastomer material is able to yield in both of these cavities, without substantially altering the concave configuration of the indentations (i.e. without showing convex deformations).

The elastomer sealing ring of relatively large diameter in accordance with the present invention prevents or greatly reduces the aforementioned tearing by correcting or greatly reducing the following problems:

a) in contrast to the prior art, the lateral expansion of the sealing ring produces a favorable stress distribution since, for example, the significant shearing forces do not arise between the base surface of the channel and the sealing ring;

b) the geometry in accordance with the present invention eliminates the dimensioned errors in sealing rings over one meter in diameter in contrast with the prior art where the sealing ring failed to assume that position in the channel which prevented stress-relieving expansion;

c) the sealing ring in accordance with the present invention rules out that the radial play between the channel and the sealing ring would be lost by virtue of the seal becoming deformed or by virtue of solids getting into the channel during fitting.

By virtue of the central foot which lies in bearing contact with the base surface of the channel, the exposed sealing surface is supported onto the base surface in the direction of load. The exposed sealing surface is thereby prevented from yielding too heavily in the direction of load, when load is applied. Excessive yielding of the exposed sealing surface in the direction of load is in fact not desirable, since this yielding can produce in the sealing surface tensile stresses which can lead, in turn, to tearings.

Moreover, it should likewise be pointed out that it is not sufficient to slightly bevel or slightly round the edges of the sealing ring, as is done systematically, for example, in respect of metallic fitting parts to prevent local stresses. In accordance with the present invention, the circumferential cavities should exhibit a generously designed, radial extent and a capacity to actually receive a substantial part of the elastomer material compressed by the application of load to the exposed sealing surface. In order to prevent tensile stresses, which can lead to tearing in the region of the indentations, these indentations are concavely configured and are dimensioned such that this concave shape is preserved even after load has been applied to the exposed sealing face. Based on these explanations, the optimal dimensions are to be determined by the person skilled in the art for each specific load instance, preferably according to the "finite elements" method.

The invention results in the elastomer material being able to yield, in the direction of load, into the channel, so that the stress distribution in the cross-section of the sealing ring is thereby favorably influenced. It has been calculated, for example, that reductions of up to 50% and more in the stresses at the critical points may be obtained by a modification of the sealing ring cross-section.

It has proved advantageous to configure the indentations in a circular-arc shape. It is moreover advantageous, if, in the unstressed state, the sealing ring rises up at right-angles from the base surface of the channel and forms the respective concave indentation and extends, also again at right-angles, in the direction of the side surface of the channel.

The exposed sealing surface is preferably configured as a convex surface, which exhibits a flat crown as contact surface for the sealing bead. When subjected to load by the sealing bead, the sealing surface is intended to change its shape only insignificantly. The stress distribution is thereby optimized still further and tensile stresses, above all, are largely prevented.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
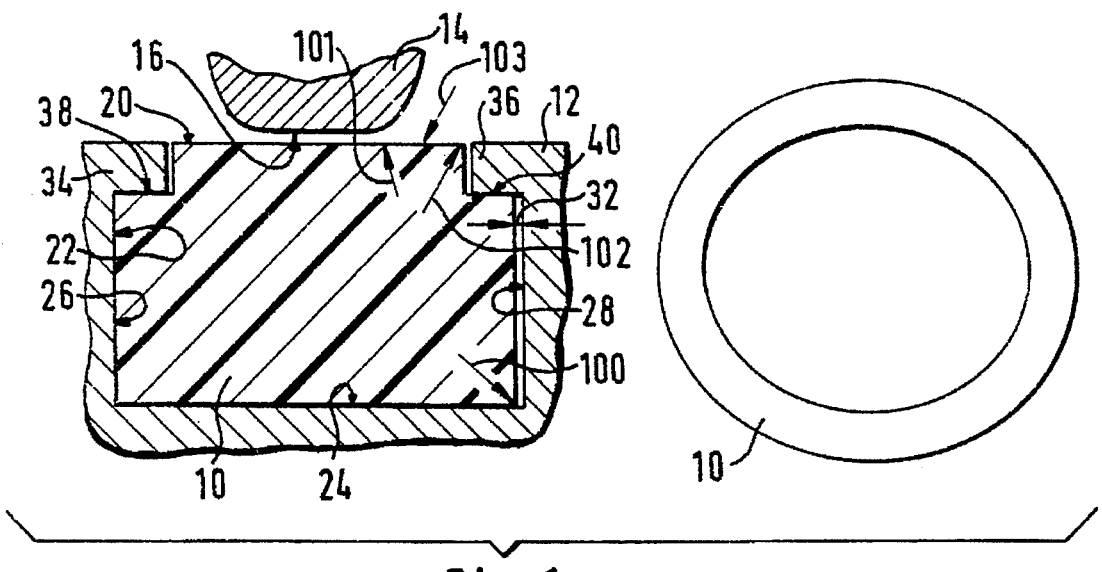
FIG. 1 shows in the left portion a section through a prior art sealing ring, as is fitted, for example, in a seat of a gastight valve of relatively large diameter, and in the right portion a top view of the prior art sealing ring.

Referring first to FIG. 1, the elastomer sealing ring of relatively large diameter of the prior art is shown generally at 10. Sealing ring 10 is made from an elastomer material, which can be fitted, for example, into the seat 12 of a gastight blast furnace valve. The closing member of the valve is herein represented by a sealing bead 14, which exhibits a flat sealing surface 16. With this flat sealing surface 16, the sealing bead 14 is pressed at high contact pressure against an exposed sealing surface 20 of the sealing ring 10, whereupon the sealing ring 10 is subjected to an approximately vertical surface load. The sealing ring 10 is fitted into an annular channel 22 which is open in the direction of the sealing bead 14. This channel 22 exhibits a flat, annular base surface 24 and two coaxial, cylindrical side surfaces 26, 28. These boundary surfaces 24, 26, 28 define a rectangular channel cross-section.

The sealing ring 10 which is shown in FIG. 1 is a sealing ring, the geometry of which has not yet been modified in accordance with the present invention. Its cross-section conforms essentially to the cross-section of the channel 22. Its width, however, is ideally slightly smaller than the width of the channel 22, so that a radial play 32 remains between the sealing ring 10 and the channel 22, at least in the unstressed state of the sealing ring 10. The sealing ring 10 is secured in the channel 22 by the two radial projections 34, 36, which respectively interact with a shoulder 38, 40 of the sealing ring 10.

In FIG. 1, the arrows 100, 101, 102 and 103 serve to indicate those places where tears most frequently arose. At 100, tears mainly arose in the peripheral direction, regardless of the state of the exposed sealing surface 20. At 101 and 102, tears arose to a greater or lesser extent in the peripheral direction around the sealing bead 14, or around the seat 12. At 103, there were particularly severe tears in the surface directly next to the sealing bead 14.

Figure 2:
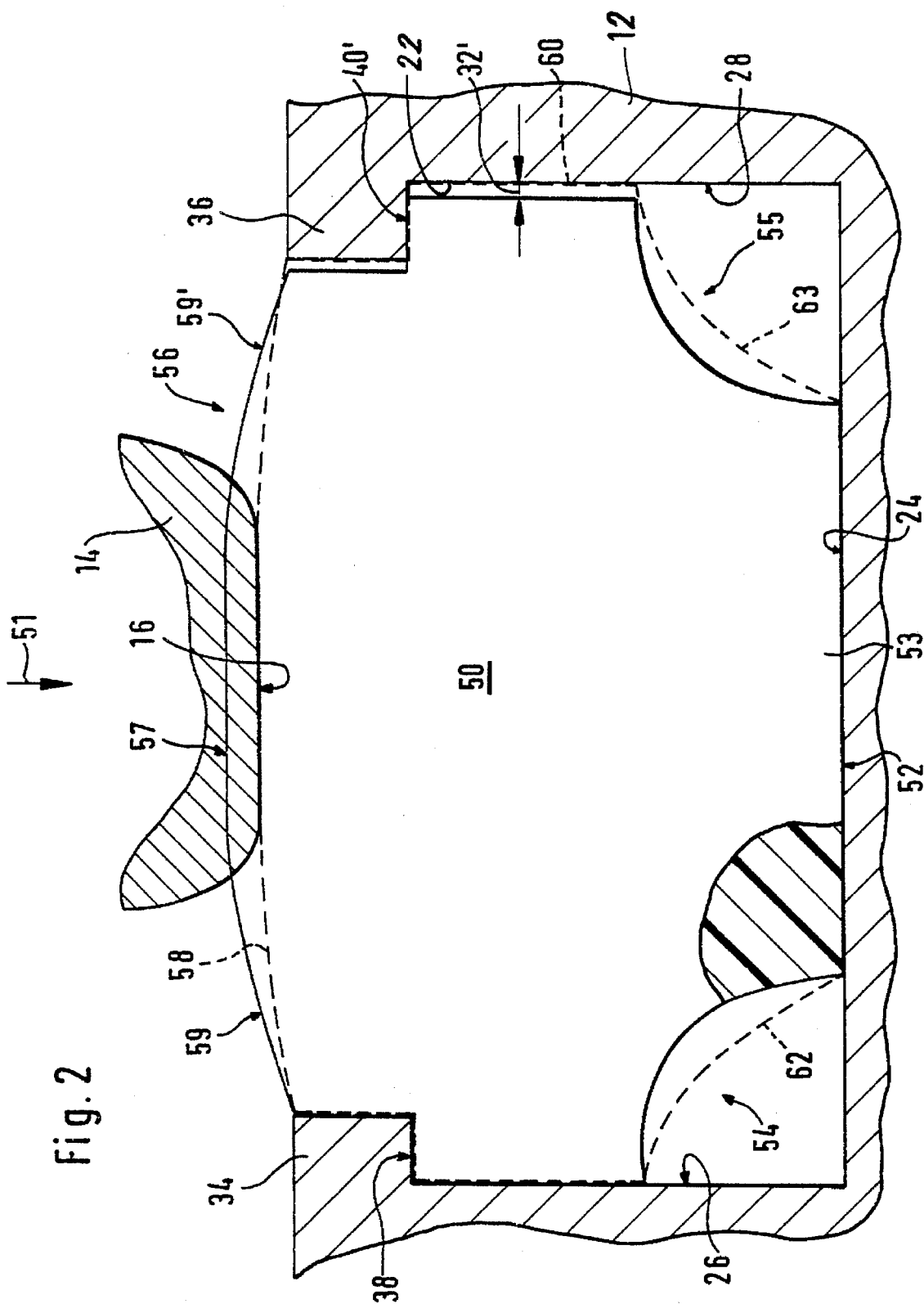
FIG. 2 shows a detailed cross-section of a sealing ting in accordance with the present invention.
Figure 4:
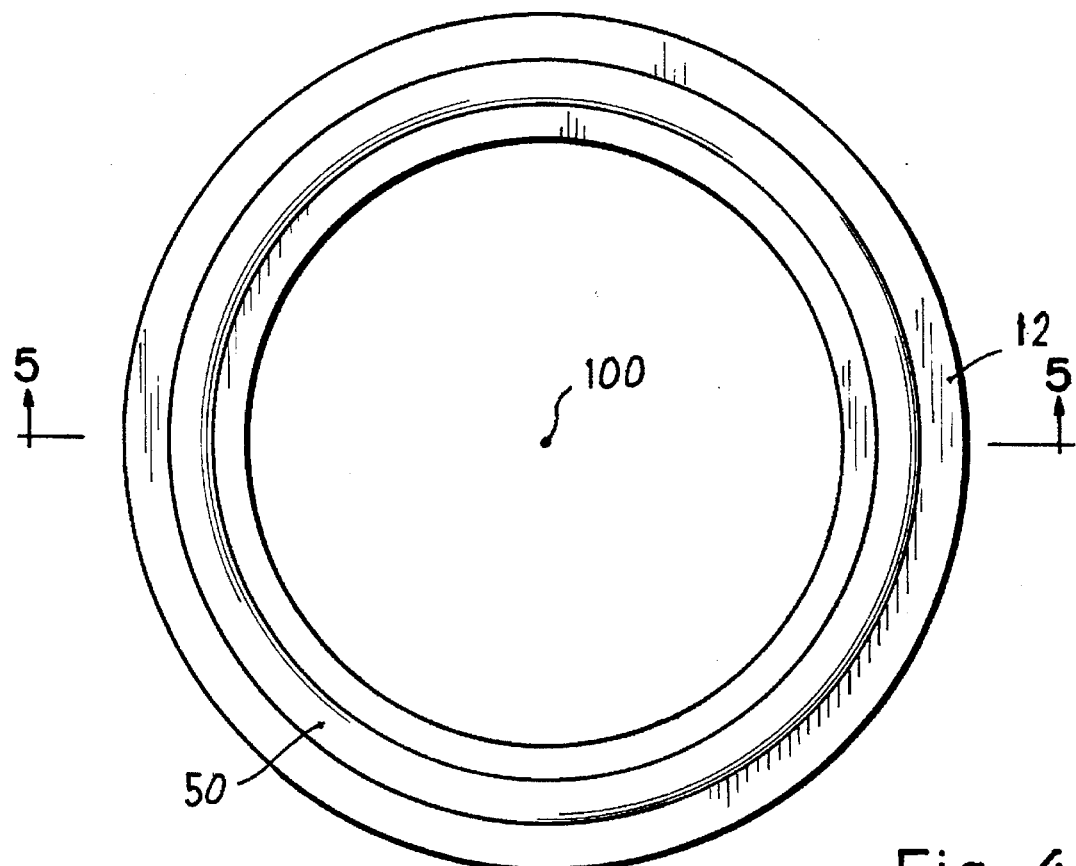
FIG. 4 shows a top plan view of the sealing ring of the present invention in its seat.
Figure 5:
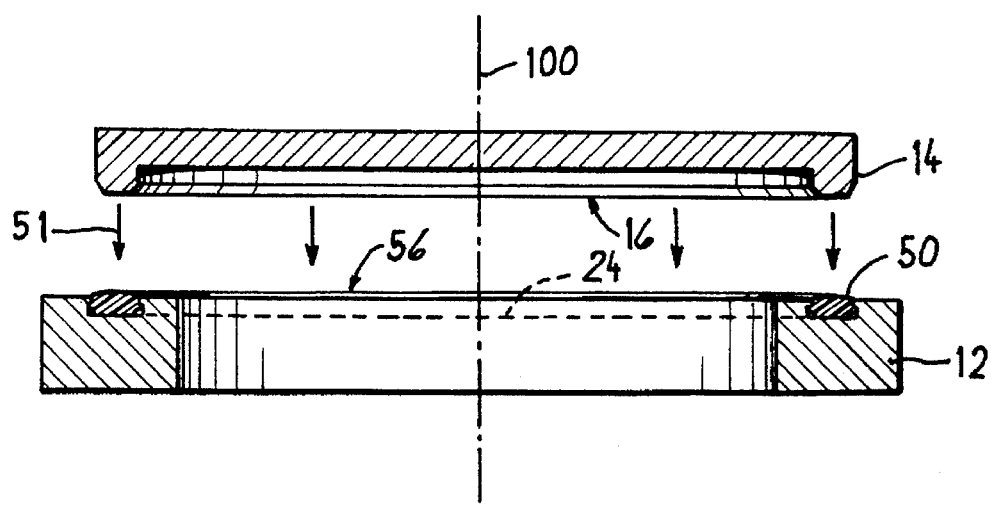
FIG. 5 is a sectional elevation view along line 5—5 of FIG. 4, and also showing the sealing bead.

Turning now to FIG. 2, there is shown, in cross-section, a sealing ring modified in accordance with the present invention. The cross-section is herein represented in the unstressed state by an unbroken line and in the stressed state by a dashed line. The sealing ring 50 is fitted with radial play 32' into the above-described channel 22 and is subjected to a surface load, as described above, by the sealing bead 14. The direction of the surface load is indicated by the arrow 51. As will be understood by those skilled in the art, the seat 12, sealing ring 50 and sealing bead 14 shown in FIG. 2, which is only a partial cross section, are all annular about a central axis. FIGS. 4 and 5 show the full annular structure, with the seat 12, sealing ring 50 and sealing bead 14 being annular about axis 100. As seen from FIGS. 2 and 5, the load imposed by sealing bead 14 on sealing ring 50 is parallel to axis 100.

The sealing ring 50 shown in FIG. 2 differs from the prior art sealing ring 10 of FIG. 1 by the fact that it exhibits, in a surface 52 lying opposite the base surface 24 of the channel 22, two concave, i.e. inwardly curved, symmetrically disposed indentations 54, 55, and by the fact that its exposed sealing surface 56 is configured as a convex, i.e. outwardly curved surface. The indentations 54, 55 are preferably configured in a circular-arc shape. In the unstressed state, the sealing ring rises up at right-angles from the base surface 24, forms the respective circular-arc shaped indentation 54, 55 and extends, again at right-angles, in the direction of the corresponding side surface 26, 28 of the channel 22. The indentations 54, 55 thus form two annular cavities in the channel 22 and span the channel 22 in an arc shape between the base surface 24 and the corresponding side surface 26, 28. Between these two annular cavities 54, 55, the sealing ring 50 forms a foot 53, which bears with its surface 52 upon the base surface 24 of the channel 22.

The exposed, convex sealing surface 56 preferably exhibits an essentially flat crown 57 as contact surface for the flat sealing surface 16 of the sealing bead 14. The crown 57 and sealing surface 16 have, in this preferred embodiment, approximately the same extents. Two convexly curved and ring shaped flange surfaces 59, 59' surround the essentially flat crown 57.

When the exposed sealing surface 56 is subjected to a surface load by the sealing bead 14, the sealing surface deforms to assume the shape represented by the dashed line 58. It will be noted that even following deformation by the sealing bead 14, the sealing surface 56 still has a convex shape. The elastomer material reacts to the compression by the sealing bead 14 by expanding at right-angles to the direction of load 51 and by exploiting the play 32' (see dashed line 60). (In this connection, it should be pointed out that the play 32' could also, of course, be symmetrically configured.) It should however be appreciated that, in addition, the indentations 54 and 55 deform in the direction of the base surface 24 (see dashed lines 62, 63). By virtue of the fact that the elastomer material flows at least partially into the cavities 54, 55 formed above the base surface 24 by the sealing ring surface 52, the radial extent of the sealing ring 50 is, of course, heavily reduced, so that even where there is too little radial play 32', no excessive stresses arise in the sealing element 50. It is important to point out that, in the deformed state, the indentations 54 and 55 are still convexly configured. In the region of the indentations 54 and 55, no significant tensile stresses are therefore generated. The shearing forces between the sealing ring and the base surface 24 of the channel 22 are likewise heavily reduced. Furthermore, it has been discovered that the deformation of the convex, exposed sealing surface 56 does not lead to any stress concentrations at the above critical points 101, 102 and 103 (see FIG. 1). The computed stresses at these aforementioned critical points are herein reduced by more than 50% in relation to the prior art sealing ring 10.

It has proved advantageous to dimension the annular shoulders or offsets 38' and 40' in the sealing ring 50 such that they bear constantly, in a seal-forming manner, against the annular projections 34, 36. The pressure medium, for example blast furnace gas, is thus prevented from penetrating into one of the cavities 54, 55. It will be noted that the pressing of the annular elements, forming the projections 34, 36, against the shoulder surfaces 38' and 40' of the sealing ring 50 has no adverse effect upon the stress distribution in the sealing ring 50.

Figure 3:
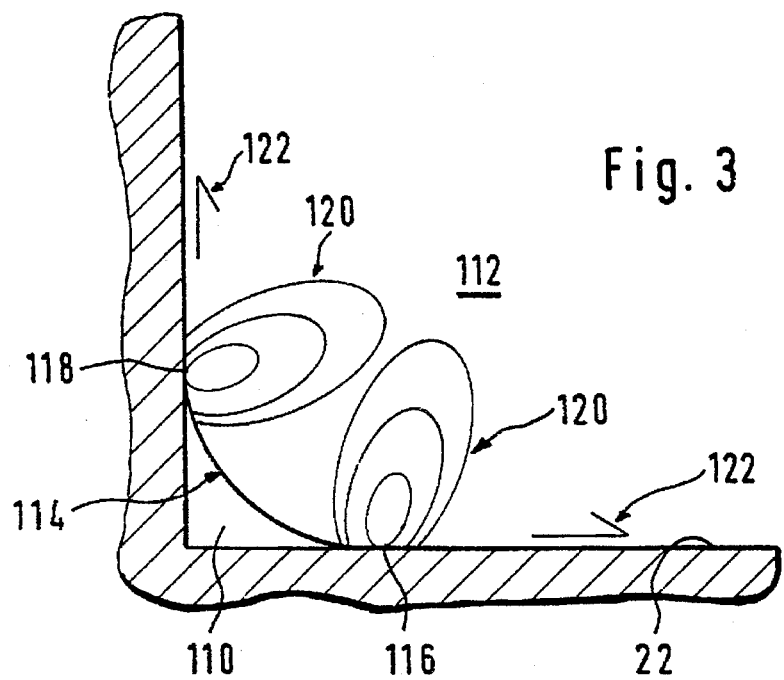
FIG. 3 shows a cross-section of a sealing ring which does not produce satisfactory results.

By comparison with FIG. 2, FIG. 3 shows an unacceptable embodiment of a cavity 110, between a sealing ring 112 and the channel 22. The radial extent of the cavity 110 is much too small to enable an exposed surface 114, which is convexly configured, to deform significantly into the cavity 110. In addition, large stress concentrations 120 and large shearing forces 122 are generated at the points 116 and 118.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A sealing seat assembly of an elastomer sealing ring in an annular channel, said sealing ring being annular about an axis, and said channel being open to one side and comprising, as boundary surfaces, a flat annular base surface around and perpendicular to said axis and two mutually opposing cylindrical and coaxial side surfaces, wherein the sealing ring:

(1) has approximately the same cross-section as said channel,
   (2) has an exposed sealing surface, which faces the open side of said channel and can be subjected to a surface load approximately parallel to said axis, said exposed sealing surface being generally convex and having a flat crown forming a contact surface,
   (3) forms a central foot, which lies in bearing contact with said base surface of said channel and is radially limited on each side by a concave indentation, and wherein each one of said concave indentations:
   (1) extends radially from said base surface up to one of said two side surfaces of said channel so as to delimit with the corresponding boundary surfaces of said channel a lateral cavity, and
   (2) is dimensioned such that, whenever said exposed sealing surface is subjected to said surface load, a substantial part of the elastomer material of the sealing ring is able to yield in both of said lateral cavities without substantially altering the concave configuration of said indentations.

2. The device of claim 1, wherein the concave indentations have a cross-section in a circular-arc shape.

3. The device of claim 1, wherein, in the unstressed state, the sealing ring rises up at right-angles from the base surface of the channel, forms the concave indentations and comes to bear, at right-angles, against the respective side surface of the channel.

4. The device of claim 1, comprising two lateral, annular offsets in the sealing ring which face towards the open side of the channel and which bear in a seal-forming manner against corresponding radial annular projections on the side surfaces of the channel.

5. A sealing seat assembly comprising:

a seat body having therein an annular channel which is open to one side and comprises, as boundary surfaces, a flat annular base surface around and perpendicular to an axis and two mutually opposing cylindrical and coaxial side surfaces spaced apart and extending from said base surface, and an elastomer sealing ring in said annular channel, said sealing ring being annular about said axis and having:
   (1) approximately the same cross-section as said channel,
   (2) an exposed sealing surface which faces the open side of said channel so as to be subjectable to a surface load approximately parallel to said axis, and
   (3) a central foot, which lies in bearing contact with said flat, annular base surface of said channel and is radially limited on opposed sides by first and second concave indentations, and wherein each of said first and second concave indentations:
   (1) extends radially from said base surface up to one of said two side surfaces of said channel so as to define with the corresponding boundary surfaces of said channel a lateral cavity, and
   (2) is dimensioned such that, whenever said exposed sealing surface is subjected to said approximately vertical surface load, a substantial part of the elastomer material of the sealing ring is able to yield in both of said lateral cavities without substantially altering the concave configuration of said indentations.

6. The device of claim 5, wherein the concave indentations have a cross-section in a circular-arc shape.

7. The device of claim 5, wherein, in the unstressed state, the sealing ring rises up at right-angles from the base surface of the channel, forms the concave indentations and comes to bear, at right-angles, against the respective side surface of the channel.

8. The device of claim 5, wherein the exposed sealing surface is configured as a convex surface, which exhibits a flat crown as a contact surface for the sealing bead.

9. The device of claim 5, comprising two lateral, annular offsets in the sealing ring which face towards the open side of the channel and which bear in a seal-forming manner against corresponding radial, annular projections on the side surfaces of the channel.

* * * * *